No. 682,470. Patented Sept. 10, 1901.
J. F. KENNEFICK.
PIPE.
(Application filed Oct. 1, 1900.)
(No Model.)

WITNESSES:
William P. Grebel
J. B. Owens

INVENTOR
John F. Kennefick.
BY
ATTORNEYS

THE NORRIS PETERS CO., PHOTO-LITHO., WASHINGTON, D. C.

UNITED STATES PATENT OFFICE.

JOHN FRANCIS KENNEFICK, OF CRIPPLECREEK, COLORADO.

PIPE.

SPECIFICATION forming part of Letters Patent No. 682,470, dated September 10, 1901.

Application filed October 1, 1900. Serial No. 31,657. (No model.)

*To all whom it may concern:*

Be it known that I, JOHN FRANCIS KENNEFICK, a citizen of the United States, and a resident of Cripplecreek, in the county of Teller and State of Colorado, have invented a new and Improved Pipe, of which the following is a full, clear, and exact description.

This invention relates to a tobacco-pipe, the purpose of which is to provide a superior means for keeping the pipe sweet and clean and rendering the smoke cool before it reaches the mouth of the smoker.

This specification is the disclosure of one form of the invention, while the claims define the actual scope thereof.

Reference is to be had to the accompanying drawings, forming a part of this specification, in which similar characters of reference indicate corresponding parts in all the views.

Figure 1:
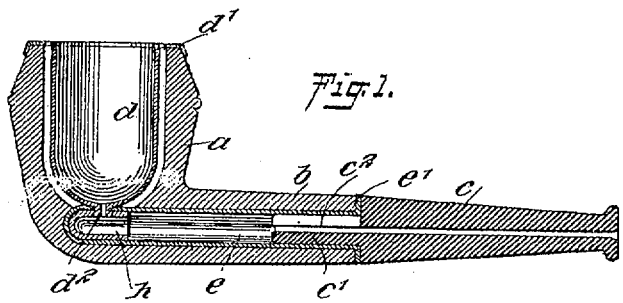
Figure 2:
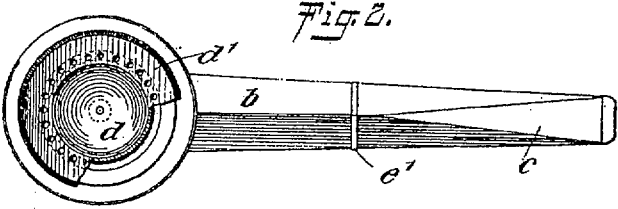
Figure 3:
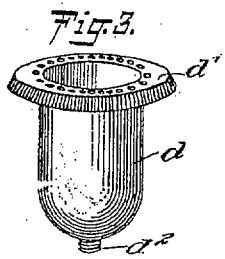
Figure 4:
Figure 6:
Figure 5:
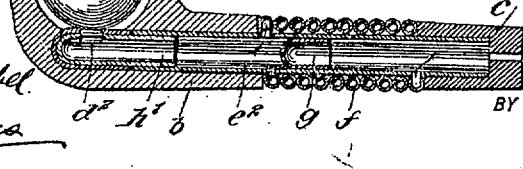

Figure 1 is a sectional view of the invention. Fig. 2 is a plan view with parts broken away. Fig. 3 is perspective view of the supplemental bowl. Fig. 4 is a perspective view of the supplemental stem. Fig. 5 is a sectional view, showing the smoke-cooling attachment. Fig. 6 is a detail view of the cooling-coil, and Fig. 7 is a section of the supplemental stem with the stopper therein for use in connection with the cooling-coil.

As shown in Figs. 1 and 2, the pipe has a bowl $a$, a stem $b$, and a mouthpiece $c$, all of the usual construction, excepting that the nipple $c'$ of the mouthpiece is formed with a longitudinal slit $c^2$, rendering it slightly compressible, so that it may be forced into the mouthpiece and held therein by the spring force of the split nipple. Within the bowl $a$ is seated a supplemental bowl $d$, formed, preferably, of metal and having its upper edge flush with the upper edge of the bowl $a$. To the upper edge of the supplemental bowl $d$ is fastened in any suitable manner a flange $d'$, which projects outward over the upper edge of the bowl $a$ and which is formed with a number of perforations, as shown best in Figs. 2 and 3, which permit the air to circulate between the bowl $a$ and the supplemental bowl $d$, it being understood that the walls of these two parts are spaced apart, so as to form an air-chamber.

The lower end of the supplemental bowl $d$, in which bowl the tobacco is placed, is formed with a threaded nipple $d^2$, screwing into the supplemental stem $e$, and a bushing $h$, fitted into the supplemental stem to thicken the same. This stem $e$ is in the form of a tube, fitting snugly, yet removably, within the bowl $d$ and provided at its outer end with a flange $e'$, which lies against the end of the stem $e$ and against which the end of the mouthpiece $c$ is pressed when the mouthpiece is in place, as shown in Figs. 1 and 2. The nipple $c'$ of the mouthpiece $c$ is introduced into the supplemental stem $e$, as shown. If desired, the inner end of the supplemental stem $e$ may be thickened or provided with a reinforce-plate at the point where the nipple $d^2$ enters the supplemental stem, which construction is illustrated in Fig. 1 and the purpose of which is to strengthen the supplemental stem at this point. With the arrangement shown the bowl $d$ and stem $e$ may be withdrawn from the pipe at any time to be cleaned, and thus the pipe may be kept free from accumulations of nicotin and other objectionable matter. The supplemental stem $e$, together with the nipple $d^2$, forms a trap, preventing the saliva from entering the bowl $d$, and by removing the supplemental stem $e$ this accumulation of saliva may be readily disposed of.

Figure 7:
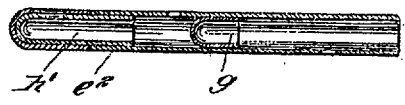

In Figs. 5, 6, and 7 I have illustrated an attachment by which the smoke is effectively cooled. According to this construction the supplemental stem $e^2$ is formed in two sections, as indicated in Figs. 5 and 7, and these sections are joined by a bushing $h'$, which also serves to receive the nipple $d^2$ of the supplemental bowl $d$. The stem $e^2$ is elongated, so as to form a space between the adjacent ends of the stem $b$ and the mouthpiece $c$. In this space is placed a coiled tube $f$, which fits snugly around the supplemental stem $e^2$ and has its ends in communication with the interior of said stem. Placed within the stem $e^2$, between the ends of the coil $f$, is a stopper $g$, preferably in the form of a cylindrical metallic thimble with a closed end. This stopper forces the smoke to pass from the inner end of the stem $e^2$ into and through the coiled pipe $f$ and thence back into the stem $e^2$ at the opposite side of the stopper, from which point the smoke enters the mouthpiece in the usual manner. The coil $f$ causes the smoke to be subjected to the cooling influence of the surrounding atmosphere, and when the smoke reaches the mouth of the smoker it is cooled considerably and will not then burn the smoker. Owing to the formation of the stem $e^2$ in two parts the outer part may be withdrawn at will for cleaning, leaving in the pipe the inner part of the supplemental stem and the bushing $h'$.

Having thus described my invention, I claim as new and desire to secure by Letters Patent—

1. A tobacco-pipe, having a main bowl, a supplemental bowl removably secured therein, the adjacent walls of the main and supplemental bowls being spaced apart to form an air-chamber and a perforate flange extending between the upper edges of the main and supplemental bowls.

2. A tobacco-pipe, having a main stem and a main bowl, a supplemental stem removably fitted within the main stem, and a supplemental bowl removably fitted within the main bowl and separated from the inner wall thereof, the base of the supplemental bowl being joined to the supplemental stem and the supplemental bowl having communication with the interior of the supplemental stem.

3. A tobacco-pipe having a bowl, a supplemental bowl fitted therein and spaced therefrom throughout its entire length to form an air-chamber, and a flange carried by the upper edge of the supplemental bowl and extending outward over the upper edge of the main bowl, the flange being perforated at points between the two bowls to open the said air-chamber to the atmosphere.

4. A tobacco-pipe, having a main stem, a main bowl, a supplemental stem removably fitted within the main stem, and a supplemental bowl removably fitted within the main bowl and being fastened to the supplemental stem at the base of the supplemental bowl, said supplemental bowl and stem having interior communication with each other.

In testimony whereof I have signed my name to this specification in the presence of two subscribing witnesses.

JOHN FRANCIS KENNEFICK.

Witnesses:
CHARLES FRANK HELLSTERN,
W. A. SEIGFRIED.